Nov. 25, 1958     K. BOYER ET AL     2,862,105
MULTI-CHANNEL PULSE HEIGHT ANALYZER
Filed Sept. 26, 1956     6 Sheets-Sheet 3

Fig. 2a

Count Pulses Delayed 1.25 μSec

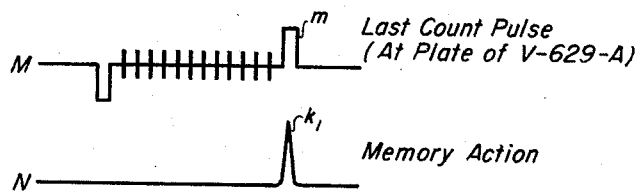
Last Count Pulse (At Plate of V-629-A)

Memory Action

Triggering Of Memory Action Pulse

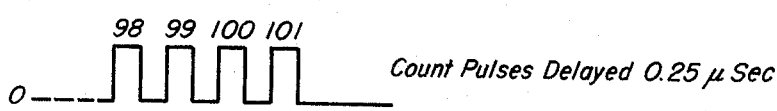
98 99 100 101
Count Pulses Delayed 0.25 μSec

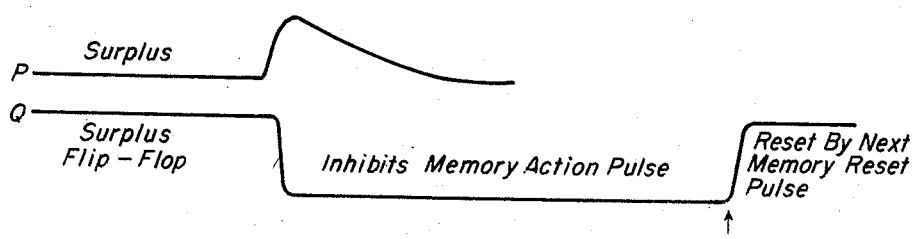
Surplus

Surplus Flip-Flop    Inhibits Memory Action Pulse    Reset By Next Memory Reset Pulse Surplus Coinc. Operation WITNESSES:
Henry Heyman
Ralph Corlid Smith INVENTORS
Keith Boyer
Charles W. Johnstone
BY
Roland O. Anderson
attorney

United States Patent Office 2,862,105
Patented Nov. 25, 1958

2,862,105
MULTI-CHANNEL PULSE HEIGHT ANALYZER

Keith Boyer, Los Alamos, N. Mex., and Charles Wilkin Johnstone, Houston, Tex., assignors to the United States of America as represented by the United States Atomic Energy Commission Application September 26, 1956, Serial No. 612,343

5 Claims. (Cl. 250—27)

This invention relates to electronic counting devices and more particularly to multi-channel pulse height analyzers capable of sorting signal pulses occurring with random rates and random amplitudes into groups corresponding to selected amplitudes and providing separate counts of the pulses falling within each selected group.

The growing complexity of nuclear experiments necessitates an accurate and rapid determination of the amplitude spectrum of pulses generated as a consequence of the radioactive state of a substance. It is frequently the case that the radioactive state of a material is artificially induced and is transient in nature so that the amplitude spectrum determination has to be made with extreme rapidity.

The pulses generally encountered in nuclear experiments occur with a Poisson distribution in time, so that at times two or more pulses occur almost simultaneously and at other times the time spacing between consecutive pulses may be considerably greater than the average spacing.

Pulse height analyzers are of several types and the present invention is directed to multi-channel devices of the type disclosed in the Institute of Radio Engineers Convention Record for 1955 by P. W. Byington and C. W. Johnstone. In brief, this type device translates the amplitude of each pulse into a time duration electrical quantity which is utilized to control the length of a train of pulses of a crystal-controlled oscillator forwarded to a scaler. The final state of the scaler for any one train of pulses selects the appropriate channel in a magnetic memory in which an additional count of one is placed.

Although pulse height analyzers of the prior art, such as that above referenced, have become increasingly competent in recent years, they have not been able to process two or more signal pulses which occur closer together than a few tens to a few hundreds of microseconds or more depending on the particular analyzer design. The reason for this is that the amplitude sorting process absorbs time in the translation of signal pulse amplitude into succeeding count pulses of number proportional to amplitude, and it has been necessary to block all incoming signals during this time. For example, a 100-channel analyzer may sort the amplitudes of interest into channels of one volt increments, in which case, the resultant count pulse trains may range from one count pulse for the lowest amplitude channel to 100 count pulses for the highest amplitude channel. It is apparent that the time consumed for translating a large signal pulse into as many as 100 count pulses spaced one microsecond apart for instance, counting the pulses, and finally actuating the proper address or channel in a memory or accumulator is longer than some intervals between signal pulses.

Since the rate of occurrence of signal pulses is random in nature, obeying a Poisson distribution, there are also some relatively long intervals between signal pulses during which the analyzer is ready and therefore idle. The present invention is directed to a temporary signal pulse storage feature in which pulse amplitude is carefully preserved, whereby the time spacing between two almost simultaneous incoming pulses is effectively "stretched out" so that there is sufficient time for the sorting and accumulating processes to be carried out for the first pulse before the second pulse is introduced into the sorter. That is, each signal pulse which is accepted is stored as a corresponding constant electrical quantity and is not transferred into the sorting and memory systems until the processing of a previous pulse is finished. In this way, the second of two signal pulses occurring in rapid sequence is not lost, and a considerable net reduction in lost signal pulses is obtained.

It is, therefore, a prime objective of the present invention to provide a pulse height analyzer containing a storage feature for storing a signal pulse so that in many instances when two signal pulses occur in rapid succession, the second pulse is preserved and processed at a later time.

This and other objects and advantages of the present invention will become apparent from the further reading of this specification taken with the drawings made a part hereof.

Referring to the drawings, Figure 1 is a block diagram of a preferred embodiment of a multi-channel analyzer in accordance with the present invention.

Figures 2 and 2a are a series of waveforms useful in explaining the system of Figure 1.

Figure 1:
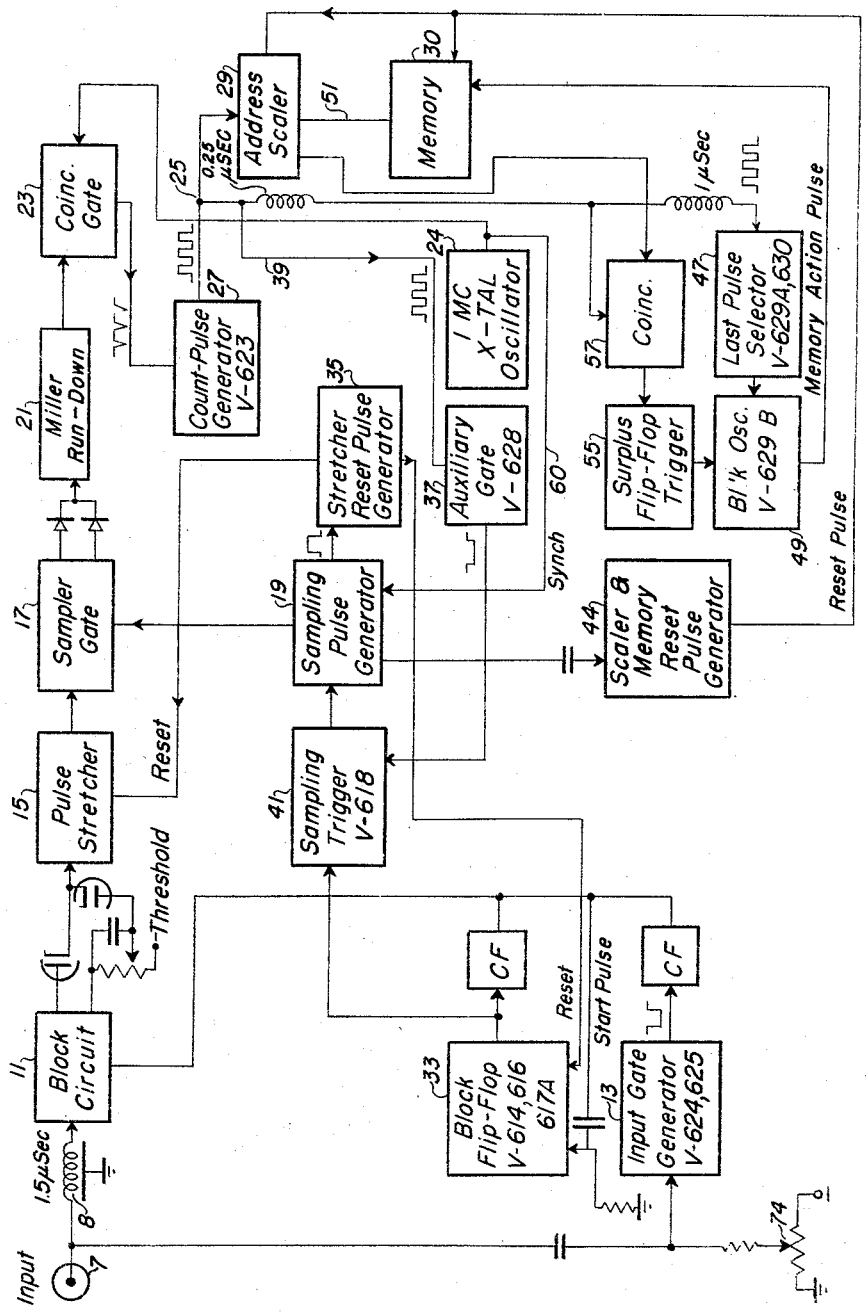
Figure 2:
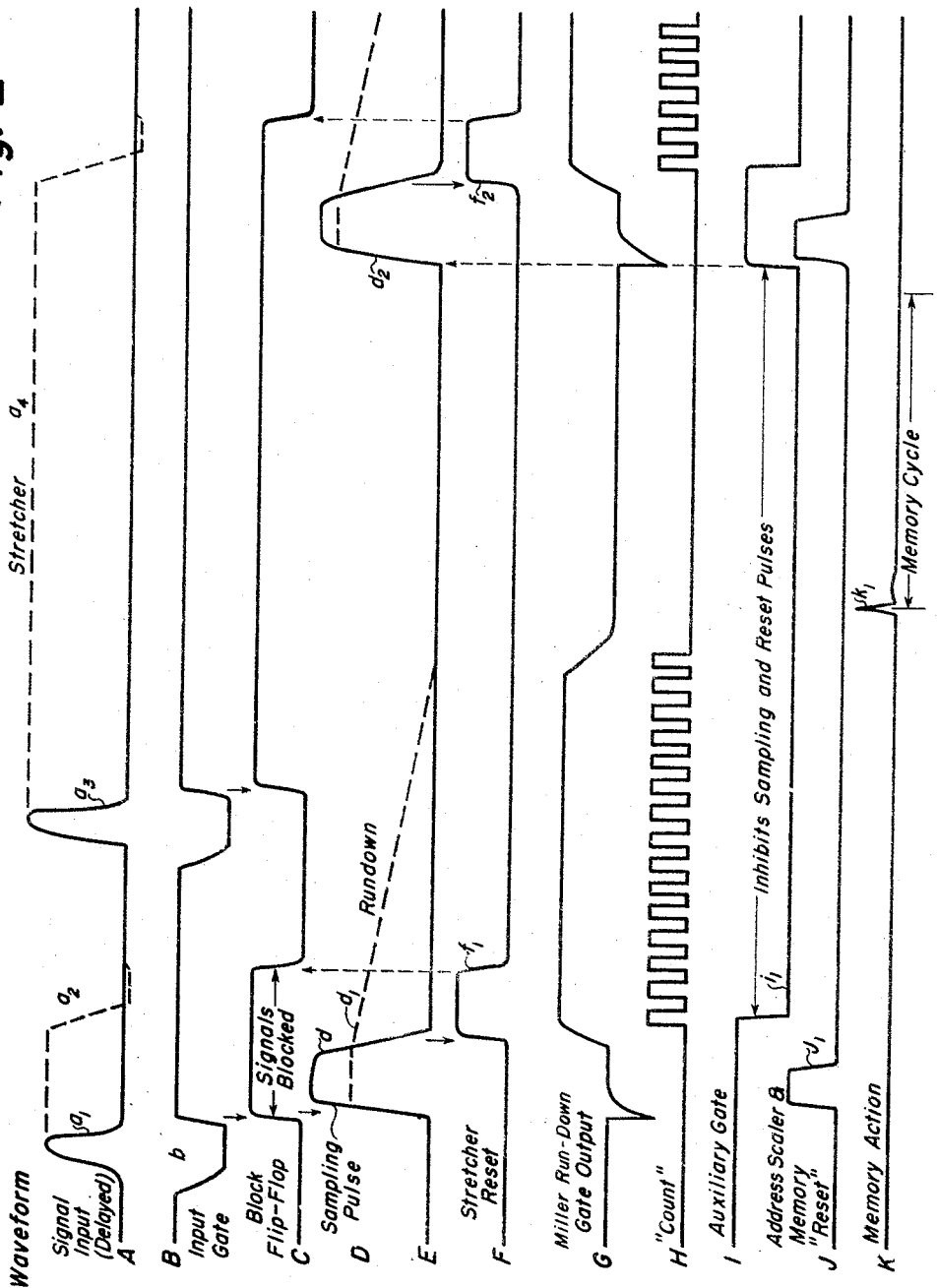

The over-all system and operation of a preferred embodiment of the pulse height analyzer of the present invention is described with reference to Figures 1, 2 and 2a.

An incoming signal pulse arriving at terminal 7 is delayed for a selected interval in delay line 8, and passes through block circuit 11 to pulse storer or stretcher 15 if the stretcher is empty. The pulse stretcher retains or stretches a substantially constant electric potential proportional to the peak value of the signal pulse until the remainder of the system is free to process it.

The modus operandi for sorting the pulses in accordance with amplitude of the present invention is the translation of each signal pulse amplitude into a corresponding number of count pulses. The translation is accomplished by the conversion in a Miller type sweep generator 21 (hereinafter termed a Miller run-down) of an input pulse amplitude into an output time duration. That is, the output of the screen of the Miller run-down is a rectangular pulse having a length proportional to the amplitude of the input pulse. The output of the Miller run-down conditions coincidence gate 23 to pass pulses from the crystal oscillator 24 to count pulse generator 27. Count pulse generator 27 provides pulses of proper shape and amplitude for accurate counting by address scaler counter 29.

The order of events in the analyzer including the sorting, counting, and memory processes require a logical sequence of controlled operations. Specifically, the contents of the pulse stretcher are retained, and applied to the Miller run-down only when the run-down circuit has finished "running down" from a previous pulse and the counting and subsequent memory processes are completed. One, and no more than one, additional signal pulse may be admitted to the pulse stretcher while the run-down circuit is occupied. Also, if an input signal pulse exceeds the highest selected amplitude of interest, it must be rejected in order to avoid a false count in the memory.

The operational sequence controls are provided by input gate generator 13, block flip-flop 33, sampling trigger 41, sampling pulse generator 19, stretcher reset pulse generator 35, and auxiliary gate 37.

The sequence of events in operation is best explained with reference to Figures 1, 2 and 2a. The input signal pulse $a_1$ is shown on waveform A, Figure 2, and is delayed in order to permit the input gate generator pulse $b$ to be generated early enough in time to open block circuit 11 to admit the leading and at least the top portion of the signal pulse. At the same time it is desirable that the gate pulse be only long enough to open the block circuit to admit one signal pulse at a time in order that two very closely adjacent signal pulses will not both be admitted. It is assumed for the purpose of this explanation that pulse $a_1$ arrives at a time sufficiently long after the previous pulse so that the Miller run-down and memory cycle have been completed.

Immediately after the signal pulse is passed by the block circuit 11, the block circuit assumes a signal blocking state as shown by the "signal blocked" portion of waveform C. The admitted input pulse passes into the pulse stretcher 15 and is stored for a short time as a constant potential as indicated by the dashed line $a_2$ of waveform A. The stretched pulse is retained in stretcher 15 only long enough for the sampling and stretcher reset pulses to be generated. When sampler gate 17 is opened, the stretched pulse potential is applied to the Miller run-down.

The Miller run-down impresses a rectangular gating pulse on coincidence gate 23 for a duration equal to that of run-down of the input charge. Coincidence circuit 23 impresses the gated output of crystal oscillator 24 onto univibrator count pulse generator 27 which generates a train of discrete count pulses for a corresponding time. It is apparent that during this duration, the passage between pulse stretcher 15 and Miller run-down 21 must be decoupled. The decoupling is provided by sampler gate 17 in its normal or untriggered state. The sampler gate is rendered conductive only upon the occasion of and during the existence of a sampling pulse generated by sampling pulse generator 19. Sampling pulse generator 19 generates an output only when sampling trigger 41 responds to the output of block flip-flop 33.

The block flip-flop responds to the input gate generator pulse $b$ shown in waveform B. The trailing edge of the gate generator pulse, i. e., that part of the gate generator pulse which occurs after the signal pulse has been propagated on to the stretcher, triggers the block flip-flop 33. The output potential of the block flip-flop inhibits any attempt on the part of the input gate generator to again open the block circuit until the block flip-flop is reset in the manner hereinafter described.

If the Miller run-down, counting and storing circuits have completed the processing of a preceding signal pulse, which is the case for pulse $a_1$, the block flip-flop also triggers the sampling pulse generator 19, the output of which is shown at $d$ in waveform D, and which transfers the stored pulse from the stretcher 15 to Miller run-down 21. The actual run-down of the Miller sweep circuit starts at the end of the sampling pulse as shown by $d_1$ of waveform D. The end or trailing edge of the sampling pulse is synchronized with one of the pulses of the crystal oscillator by connection 60 between the crystal oscillator and the sampling pulse generator. It follows that the initial positive portion of the Miller run-down gate output is also synchronized with a crystal oscillator pulse as shown by waveforms G and H of Figure 2.

The stretcher reset pulse generator 35 is triggered by the end of the sampling pulse and produces reset pulse $f_1$, waveform F, and the block flip-flop is reset by the end of the stretcher reset pulse.

As long as the Miller run-down is generating an output gate pulse it is necessary that no additional sampling pulses be generated by sampling pulse generator 19. This inhibiting function is provided by auxiliary gate pulse generator 37 which is triggered by the first count pulse of a given train of output count pulses by connection 39 to count pulse terminal 25. The auxiliary gate generator has a controlling time constant which is recharged by each new count pulse so that the gate pulse $i_1$, waveform I, lasts a selected interval after the final count pulse to permit memory operations to be completed before a new signal pulse is processed. The auxiliary gate output pulse is impressed on sampling trigger circuit 41. Therefore, although a second input pulse $a_3$ may trigger input gate generator 13 which in turn may again start block flip-flop 33, the sampling trigger is inhibited from responding to the block flip-flop signal. It follows that the second pulse remains in the stretcher until the end of the memory cycle for the preceding signal pulse, and that the signal input likewise remains blocked. Upon the end of the auxiliary gate pulse, a new sampling pulse, $d_2$, is finally triggered, followed by a stretcher reset pulse $f_2$ and the signal block is removed.

A scaler reset pulse $j_1$ is generated by scaler reset pulse generator 44 in response to the leading edge of the sampling pulse generator output. It is also used for resetting certain circuits in the memory.

The last count pulse is selected by last pulse selector 47. The delayed count pulses shown at L, Figure 2a, are applied to the grid of an inverter stage which has a shorted delay line as a plate load. The time constant of the delay line is one half the designed period of the count pulses and in the preferred embodiment in which the period of the count pulses is 1 $\mu$sec., the constant of the delay line is 0.5 $\mu$sec. All except the first and last count pulses appearing at the plate are cancelled by the delayed reflection of a preceding pulse. The reflected last pulse shown at $m$ in waveform M is the only large positive going signal capable of triggering blocking oscillator 49. The blocking oscillator generates memory action pulse $k_1$ shown in waveform N and in waveform K, Figure 2.

An input pulse having a magnitude exceeding that of interest, i. e., the magnitude assigned to the 100th channel, causes $100+n$ pulses to be generated. To avoid the spurious storing of such a signal pulse in channel $n$, provisions are made for inhibiting the generation of the memory action pulse. The address scaler can be made to supply a unique "surplus" pulse in response to the 100th count pulse, subject to a small inherent delay. By delaying the count pulses a duration equal to the inherent delay less the period of the count pulses, Figure 2a, coincidence is obtained between the surplus pulse and the count pulse. The delayed count pulses are shown in waveform O of Figure 2a, and the surplus pulse in waveform P. Coincidence circuit 57 (Figure 1) generates an output pulse in response to the coincidence of the 101st delayed count pulse and the surplus pulse and trigger surplus flip-flop 55. The action of flip-flop 55, waveform Q of Figure 2a, inhibits blocking oscillator 49 from generating a memory action pulse. The orginal state of the surplus flip-flop is restored by the next memory reset pulse.

The detailed structure and operation of the preferred embodiment of the pulse height analyzer of this invention are explained with reference to Figures 3, 4 and 5, which when taken together, provide a continuous schematic drawing. The values of components having critical value are shown in the manner conventional in the art to save space, i. e., resistance values of from 0 to 999 ohms are indicated by a simple numeral, and are distinguishable from higher values by the use of the k or meg. indication whenever values are in the thousand or megohm range. Capacitances in the micro-microfarad range are shown in whole number form, and microfarad values are shown in decimal form.

The input signal terminal is coupled through delay line 8 to input amplifier tubes V-601 and V-602 and cathode follower V-603. The output of cathode follower V-603 is coupled to the control grid of V-607 and also to the anode of block tube V–604B. Since the cathode of V–604B is grounded, i. e., in shunt with the signal path to V–607, this tube short circuits the signal path when its grid bias is such as to give it a low anode-cathode interelectrode resistance.

The signal output of V–607 is coupled through diode V–635A to the anode and Miller capacitor 75 of pulse stretcher tube V–609. The threshold value of pulses to be stretched is adjustably selected by the action of V–605, V–606, and adjustable potentiometer rheostat 76 in the cathode leg of V–605. It follows that any pulse exceeding the threshold value will charge the Miller capacitor through V–635B across the anode and control grid of V–609, and this charge will remain substantially constant for a much longer period of time than is required by the operation of this device.

V–607 and V–635A provide a D.-C. reference voltage for the anode of the Miller run-down, V–609. Pulses at the cathode of V-603 are filtered out by the 200K resistor and 0.1 microfarad capacitor so only the D.-C. level of the cathode of V–603 is impressed on the grid of V–607. The pulses arrive at the anode of V–609 through the other D.-C. path which includes V–605 and V–635B. Any drift in the cathode potential of V–603 does not cause any appreciable shift in the threshold due to the fact that the anodes of V–635A and V–635B will both move by the same amount of voltage. When not running down, the anode potential of V–609 is held or clamped by V–635A which conducts and supplies part of the anode current of V–609. The threshold voltage is in fact the D.-C. voltage differential between the anodes of V–635A and V–635B, and this voltage differential is thus stabilized regardless of any given setting of the threshold potentiometer 76.

From the foregoing description of the input signal channel, it is apparent that no mechanism has thus far been described which will permit one and only one signal pulse to pass to the stretcher at a time, and further, no mechanism has thus far been described which will prevent a signal pulse from passing on to the stretcher even though the stretcher is occupied with a preceding signal pulse charge.

The input gate pulse generator comprising tubes V–624, V–625A, V–625B and V–626A are provided to open circuit block tube V–604B just long enough to permit one signal pulse at a time to pass on to stretcher V–609.

The input signal is impressed on the control grid of gate discriminator tube V–624, the bias of which is adjustably controlled by the potentiometer 70. The threshold of gate discriminator tube V–624 is set slightly lower than that of the signal channel.

The output of gate discriminator tube V–624 is coupled to gate pulse univibrators V–625A and V–625B. The duration of the gate pulse is determined by the adjusted value of potentiometer rheostat 71. The gate duration is adjusted to maintain the signal channel open at least long enough to admit the leading portion, and top of a signal pulse. At the same time the gate duration should be no longer than necessary in order to minimize the possibility of a second pulse being admitted.

The output of the univibrator is coupled into cathode follower V–626A and from thence to the control grid of block tube V–604B. The unblockinng pulse is a negative substantially rectangular pulse as shown. It open circuits the block tube shunted across the signal channel in time to permit the passage of the signal pulse delayed by delay line 8 to the stretcher.

The sudden open circuiting of the block tube tends to generate an unwanted transient which could partially charge the stretcher capacitor, so to counterbalance this effect an opposite polarity pulse is coupled from the cathodes of the univibrator to the anode of the block tube.

The block tube is to be open circuited only when an input signal pulse occurs and the stretcher is unoccupied. It follows that once an input signal is passed by the block tube, it is necessary that the block tube resume its blocking condition and maintain this condition until the stretcher is ready for another signal pulse even though signal pulses may occur in the meantime. To this end, the block flip-flop, comprising V–614B and V–616A, is provided.

The cathode of the input gate generator cathode follower V–626A is coupled to the grid of the block flip-flop driver tube V–614A. The output of V–614A is connected to the anode junction of V–614B of the block flip-flop pair. The end of the input gate generator pulse provides the start pulse for the block flip-flop.

The transfer of conduction from V–616A to V;614B causes a positive potential to be applied to the grid of cathode follower V–617B which impresses a continuing positive potential on the grid of the block tube. This positive potential continues as shown in Figure 2, waveform C, until the block flip-flop is restored to its original state.

Since it is desired that the block tube be in blocking condition as long as the stretcher is occupied, it follows that it should be restored in response to the instant of availability of the stretcher.

Figure 3:
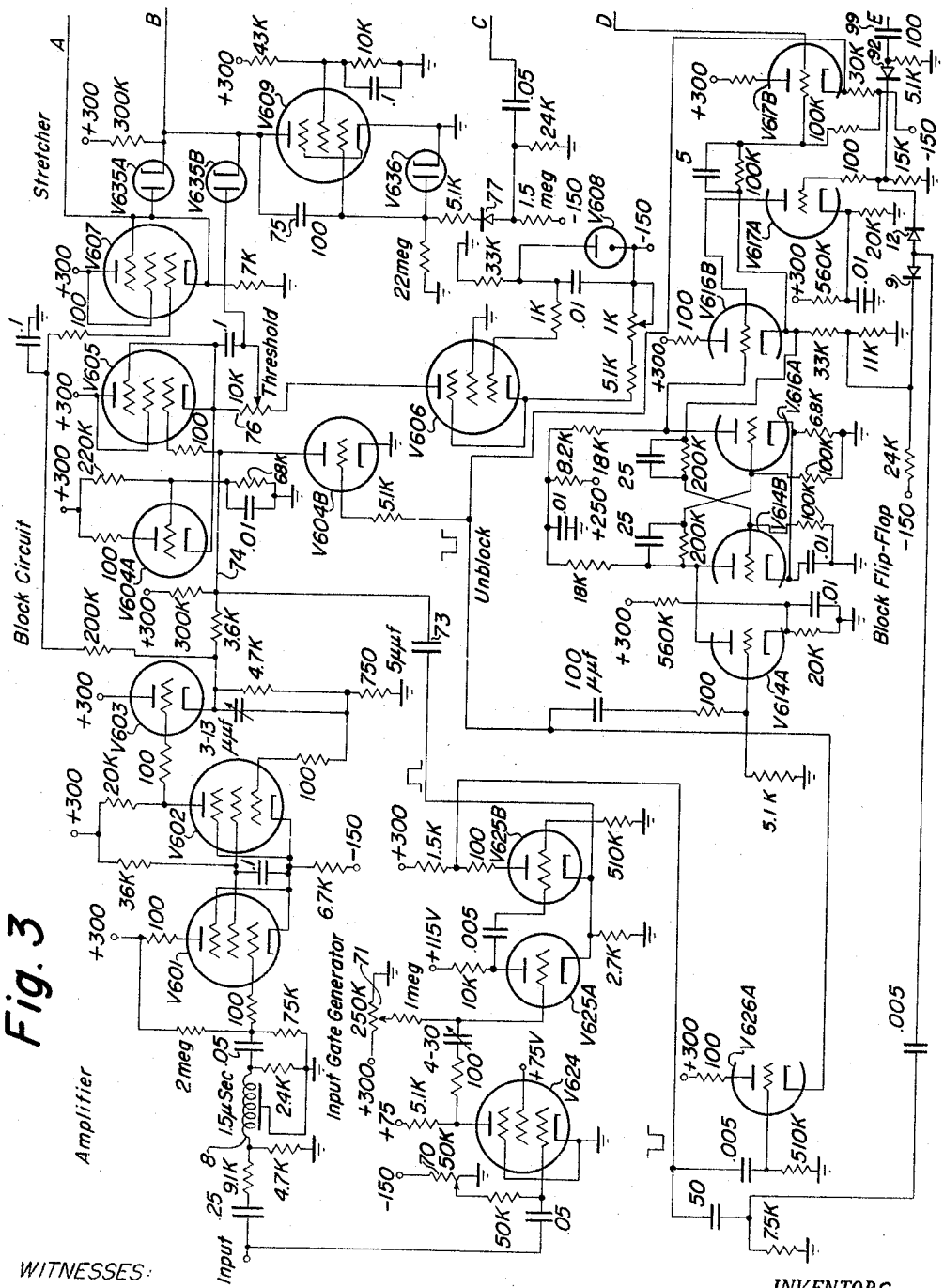
Figures 3, 4 and 5 are each a part of a complete schematic diagram of a preferred embodiment.
Figure 4:
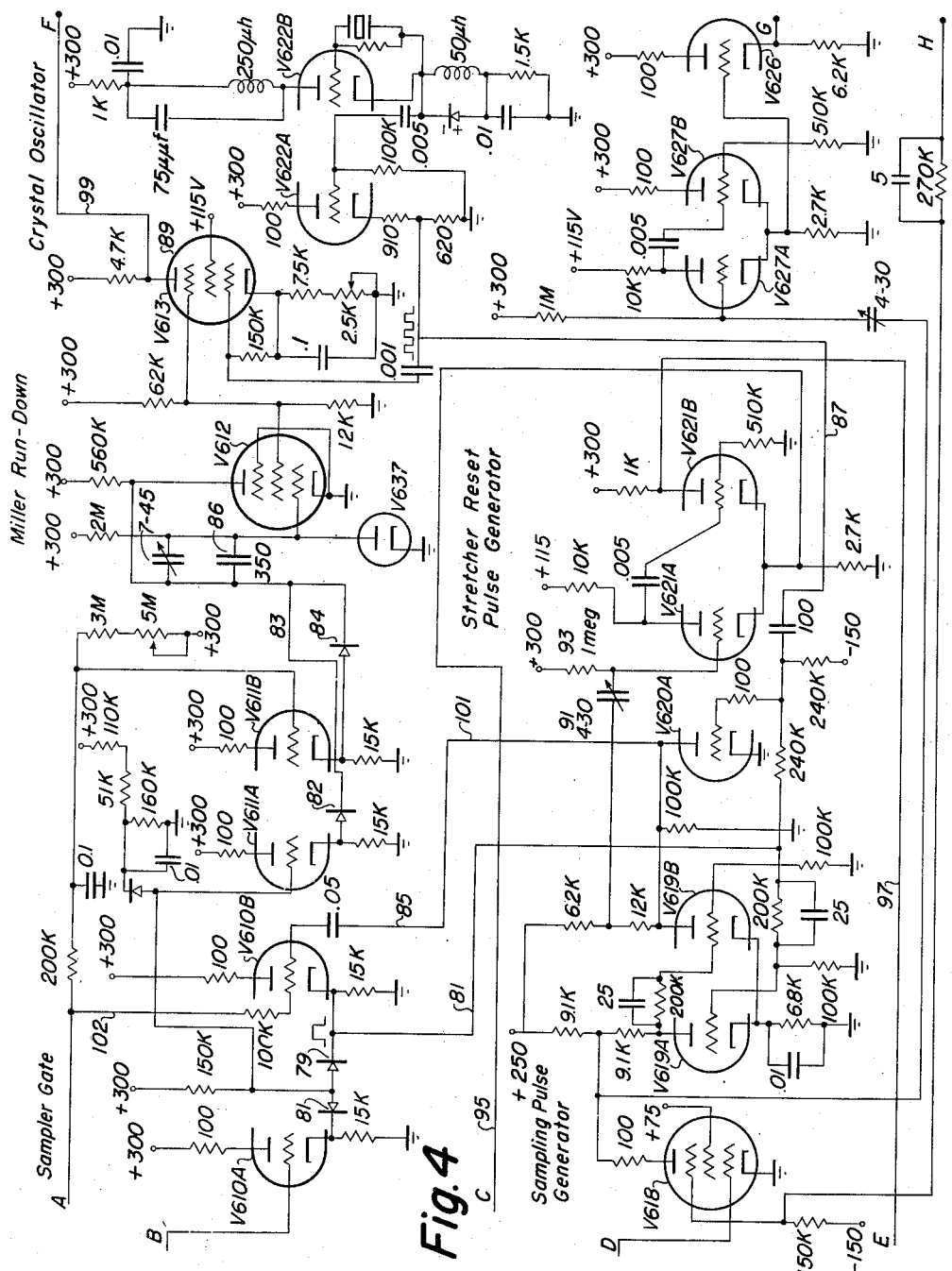

Referring to Figures 3 and 4, the anode of stretcher tube V–609 is connected to the input of the sampler gate comprising tubes V–610A, V–610B and diodes 79 and 81. The sampler gate is operated at the appropriate time by sampling gate generator comprising tubes V–618, V–619A, V–619B, and V–620A. Tubes V–619A and V–619B constitute a flip-flop. The input control grid of the sampling pulse generator tube V–618 is coupled to the output of the block flip-flop which generates a blocking pulse in response to the end of an input gate pulse. If the auxiliary gate is not acting to hold bus H negative, V–618 responds to and impresses a negative pulse on the grid of tube V–619B, thereby transferring conduction to V–619A. The positive pulse on the anode of V–619B is coupled to the grid of sampler gate tube V–610B. The positive potential on the stretcher anode is applied to the grid of V–610A.

Diodes 79 and 81 provide a gate between V–610A which has the stretcher potential impressed on it and tube V–611A which is provided to pass a corresponding charging potential on to the run-down capacitor 86. The junction of the diode coupled gate is clamped by the cathode of V–610B as long as the cathode is at a negative potential with respect to the potential on the cathode of V–610A. The potential on the cathode of V–610A is proportional to the potential on the anode of stretcher tube V–609 (Figure 1).

In response to the sampler pulse the cathode of V–610B rises to a more positive potential than the cathode of V–610A and the diode gate junction passes the stretcher potential on to the grid of V–611A. The proportional potential thus generated across the cathode resistor of V–611A charges run-down capacitor 86.

The screen grid of the Miller run-down is connected to tertiary grid of coincidence tube V–613.

Crystal-controlled oscillator V–622B provides a source of accurately timed, evenly spaced oscillations. The crystal-controlled oscillator is cathode coupled to buffer tube V–622A which in turn is coupled to the first grid of coincidence tube V–613. The coincidence of the rectangular output pulse of the Miller run-down and the oscillations from the crystal-controlled oscillator result in the generation of a train of pulses in the coincidence tube output having a length, i. e., number of pulses, corresponding to the input signal pulse amplitude.

In order to prevent channel boundary jitter, the crystal-controlled oscillator is coupled to the sampling pulse univibrator so that the end of the sampling pulse is synchronized with one of the crystal-controlled oscillator pulses. The run-down of the Miller sweep circuit also commences at the end of the sampling pulse with the result that the output pulse from the Miller run-down starts in synchronism (in the same phase) with respect to the oscillator pulses.

The stretcher, having had the value of its stored potential translated into a corresponding charge on the rundown capacitor, is available for reuse.

A stretcher reset univibrator comprising tubes V-621A and V-621B is provided and is coupled to the output of sampler pulse generator tube V-619B. It is triggered by the end of the sampling pulse. The positive pulse available at the cathodes of V-621A and V-621B is coupled through conductor 95 and terminal C to the control grid of stretcher V-609. The positive pulse renders the stretcher tube conductive thereby discharging capacitor 75.

The block flip-flop V-614A and V-616A is also reset by tube V-617A which responds to the output of the stretcher reset univibrator via a network comprising conductor 97, terminal E, capacitor 99, and diode 92.

It was previously mentioned that, in the event the rundown is occupied with a previous signal pulse when a new signal pulse arrives, the sampling pulse generator must not be triggered even though the input gate generator responds to the new signal pulse and the block flip-flop starts again. The new signal pulse therefrom remains in the stretcher until a later time.

Figure 5:
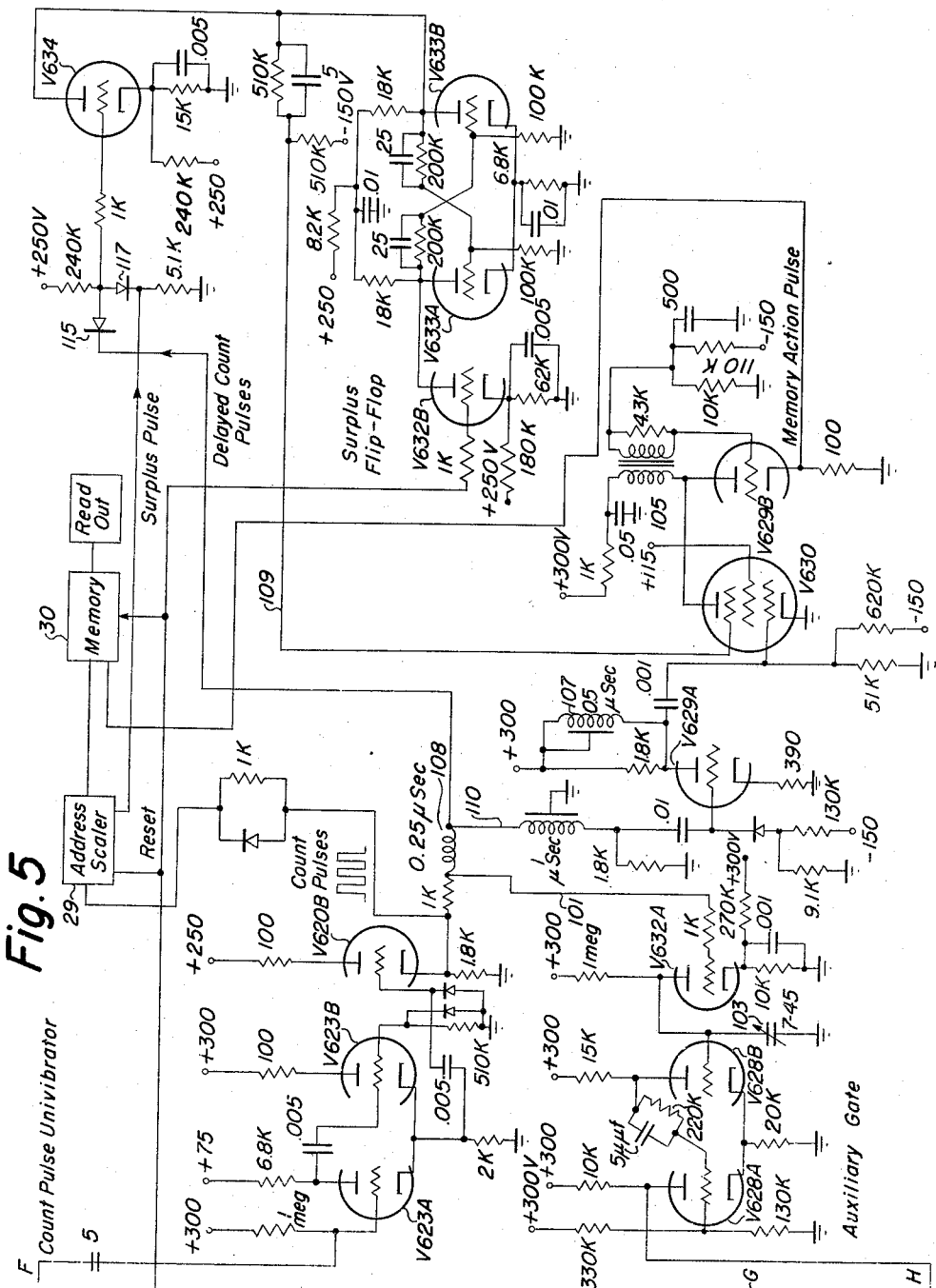

The inhibiting function is supplied by the auxiliary gate comprising tubes V-628A, V-628B, and V-632A, shown in Figure 5. The inhibiting action exists, due to the time constants of the circuit, during any train of count pulses and, in the embodiment shown, for 16 microseconds after the last count in order to permit the memory cycle to be completed.

The output pulses from coincidence tube V-613 trigger univibrator V-623A and V-623B which, together with cathode follower V-620 provide count pulses of suitable size and shape for address scaler 29.

The cathode coupling resistor of the count pulse univibrator V-623A, V-623B is coupled to the auxiliary gate input tube V-632A. The first count pulse triggers the auxiliary gate univibrator. The restoring time of the univibrator is set by capacitor 103 to about 16 microseconds so that the count pulses occurring every microsecond in each train keep it in the triggered state until 16 microseconds after the last count pulse of the train. The depressed potential at the anode of V-628A is coupled through terminal H to the tertiary grid of coincidence tube V-613, which is also the input tube of the sampling pulse generator univibrator V-619A, V-619B. Therefore, as long as the auxiliary gate generator is in the triggered state, a sampling pulse cannot be generated, and the sampler gate cannot pass the stretched pulse to the Miller run-down. In addition, the block flip-flop remains in its triggered stage, preventing any further incoming signal pulses from reaching the stretcher. Finally, at the end of the auxiliary gate, the potential on bus H switches from negative to positive, and since bus D has remained positive since the block flip-flop was retriggered, V-618 now conducts and triggers the sampling pulse generator. This causes the stretcher contents to be transferred to the Miller run-down and is followed by a stretcher reset pulse which also resets the block flip-flop.

Whenever, following the action of the Miller run-down, the train of count pulses is completed, a memory action pulse is generated to effect the transfer of the information in the address scaler over to the memory. The memory action pulse is generated by a blocking oscillator comprising tube V-629B. The last pulse of a train of pulses is identified by tube V-629A. Tube V-629A has a 0.5 microsecond delay line as a plate load and its control grid is coupled to the count pulse channel. All except the first and last count pulses appearing at the plate are cancelled by the delayed reflection of a previous pulse. The reflected last pulse provides a positive going signal capable of triggering the blocking oscillator through tube V-630. The coupling circuit to the input of the memory action pulse generator is provided with delay lines 108 and 110 to allow the counting system to stabilize before the memory action pulse is generated.

Tube V-630 can be rendered non-conductive to inhibit the generation of a store pulse if the pulses in a train exceed the permissible number of counts. The inhibition function in response to an excessive number of counts is provided by the surplus flip-flop comprising tubes V-633A and V-633B. A surplus pulse connection is brought out of the address scaler in response to the 100th count pulse, subject to about 1.25 μsec. delay. Diodes 115 and 117 provide coincidence gate to tube V-634. All count pulses are applied to diode 115 but only the surplus pulse is applied to diode 117 so that an input pulse to tube V-634 occurs only if a coincidence occurs between the surplus pulse and the 101st count pulse. In the event of 101 or more count pulses, tube V-634 generates an output pulse which triggers flip-flop V-633A, V-633B, thereby depressing the potential on the tertiary grid of V-630 and preventing the generation of a memory action pulse.

The address scaler is reset by the leading edge of each sampling pulse and the same pulse is impressed on the input of tube V-632B to reset the surplus flip-flop. The analyzer is then available to process the next signal pulse.

To facilitate the practical working of this invention the critical values of components are shown in the drawing. The identification of the tubes and diodes is as follows:

Tube:

| | Type |
|---|---|
| V-601, 602 | 6AH6 |
| V-603, 604, 610, 611 | 5687 |
| V-619, 621, 625, 627, 628 | 5844 |
| V-605, 606, 607 | 6197 |
| V-635 | 6AL5 |
| V-609 | 6AK5 |
| V-636, 637 | 5647 |
| V-612, 630 | 6AS6 |
| V-613, 618, 624 | 6BN6 |
| V-614, 616, 617, 620, 622, 623, 626, 629, 632, 633, 634 | 6BQ7 |
| V-608 | 5651 |

Diodes:

| | |
|---|---|
| 79, 81, 82, 84 | T-8 |
| 77 | S-5 |
| Remainder | IN67A |

The address scaler utilized with the present invention utilizes beam switching tube Type Haydn 6700. Circuits suitable for use with this type are described by John Bethke in Electronics Magazine for April 1956, pages 122–126. The magnetic core memory is well-known in the art. These devices are briefly described in the aforereferenced Institute of Radio Engineers Convention Record for 1955.

Obviously many modifications and variations of this invention are possible in the light of the above techniques. An obvious extension of this idea would be to provide temporary storage facilities for more than one pulse, thus reducing the losses still further. It is, therefore, to be understood that the scope of this invention is intended to be limited only by the appended claims taken in the light of the prior art.

What is claimed is:

1. A multi-channel pulse height analyzer comprising means for translating the amplitude of each of a plurality of random amplitude input signal pulses into a corresponding electrical duration quantity, means for translating the duration quantities into corresponding numbers of count pulses, means for translating the plurality of count pulses corresponding to an input signal pulse into a memory add pulse, means for storing a succeeding input signal pulse while said translation means are processing a preceding pulse signal pulse, and means responsive to the last count pulse for transferring the stored pulse to the translating means.

2. Apparatus for counting electrical signal pulses comprising an electronic signal pulse sorting and counting device, means for stretching each input signal pulse, means for converting each preceding stretched input signal pulse into a discrete number of count pulses in accordance with amplitude, counting means and means for impressing said count pulses on said counting means, and means responsive to the last of said count pulses corresponding to an input signal pulse for transferring the contents of the stretching means into said converting means.

3. An electrical pulse counting device comprising signal input means, pulse storing means, signal pulse blocking means coupled between said signal input means and said storing means, means for translating each signal pulse into count pulses, gate means coupling said storing means to said translating means, a memory, means coupling said translating means to said memory, an input gate generator coupled to said signal input means, means responsive to the output of the translation means during the translation of said signal pulse for maintaining said blocking means in block condition, means responsive to the input gate generator and to means responsive to the output of the translation means at the completion of the processing of a signal pulse for transferring the contents of the pulse storing means into the translation means, and for admitting a new signal pulse into the pulse storing means.

4. A multi-channel pulse height analyzer comprising a pulse sorter, a scaler and a multi-channel memory, said pulse sorter comprising means for stretching an input signal pulse amplitude into a constant electrical quantity, means for translating each said electrical quantity into a corresponding plurality of count pulses, means for impressing said count pulses on said scaler, including a blocking circuit coupled between the signal pulse input and the pulse converting means, said blocking circuit being blocked in the absence of an inactivating pulse, an input pulse gate generator, means responsive to the output of the input pulse gate generator and to the last count pulse output of the translating means for inactivating said block means for transferring the contents of the pulse converting means into the translation means and for passing a new input signal pulse into the pulse stretching means, and means responsive to the translating means last count pulse for transferring the contents of the scaler into the memory.

5. The analyzer of claim 4 including means responsive to an accumulation in the scaler of count pulses exceeding a selected number for inhibiting the transfer of the scaler contents into the memory.

References Cited in the file of this patent

UNITED STATES PATENTS

| | | |
|---|---|---|
| 2,529,666 | Sands | Nov. 14, 1950 |
| 2,554,112 | Libois | May 22, 1951 |
| 2,745,006 | Chu et al. | May 8, 1956 |
| 2,759,998 | Labin et al. | Aug. 21, 1956 |
| 2,775,698 | Bell et al. | Dec. 25, 1956 |
| 2,804,606 | Reaves | Aug. 27, 1957 |